United States Patent
Kazmi et al.

(10) Patent No.: US 9,510,352 B2
(45) Date of Patent: Nov. 29, 2016

(54) METHODS AND ARRANGEMENTS IN CELLULAR COMMUNICATION SYSTEMS

(75) Inventors: Muhammad Kazmi, Bromma (SE); Christian Bergljung, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/201,595

(22) PCT Filed: Jul. 5, 2011

(86) PCT No.: PCT/SE2011/050904
§ 371 (c)(1),
(2), (4) Date: Oct. 12, 2011

(87) PCT Pub. No.: WO2012/023895
PCT Pub. Date: Feb. 23, 2012

(65) Prior Publication Data
US 2012/0058772 A1 Mar. 8, 2012

Related U.S. Application Data (60) Provisional application No. 61/374,314, filed on Aug. 17, 2010.

(51) Int. Cl.
*H04W 72/04* (2009.01)
*H04W 8/24* (2009.01)
(Continued)

(52) U.S. Cl.
CPC ....... *H04W 72/048* (2013.01); *H04M 1/72525* (2013.01); *H04W 8/245* (2013.01); *H04W 8/22* (2013.01); *H04W 88/06* (2013.01)

(58) Field of Classification Search
CPC ..... H04W 72/04; H04W 76/02; H04W 8/25; H04M 3/42178; H04M 1/72525
USPC .......................................................... 455/450
See application file for complete search history.

(56) References Cited

U.S. PATENT DOCUMENTS

2002/0102980 A1 * 8/2002 Jokinen ........................ 455/450
2003/0129980 A1 7/2003 Sayeedi
(Continued)

FOREIGN PATENT DOCUMENTS

WO 2007022429 A2 2/2007
WO 2008107264 A1 9/2008
(Continued)

OTHER PUBLICATIONS

Ericsson et al., "Inter-band carrier aggregation scenarios", 3GPP Draft, TSG-RAN Working Group 4 (Radio) meeting Ad Hoc #1, Sophia Antipolis, France, R4-100089, Jan. 18-22, 2010.
(Continued)

*Primary Examiner* — Matthew Sams
(74) *Attorney, Agent, or Firm* — Coats & Bennett, P.L.L.C.

(57) ABSTRACT

The disclosure relates to methods and arrangements wherein a user equipment (UE) supporting a first frequency band $H_B$ is enabled to communicate with a network utilizing a second frequency band. The second frequency band is a sub-band of the first frequency band or overlaps with the first frequency band. The UE, which supports the first frequency band, implements 32 the channel numbering scheme of the second frequency band $S_B$ which overlaps with the first frequency band $H_B$. This enables the UE supporting the first frequency band $H_B$ to recognize the second frequency band $S_B$ and communicate 33 with the network when the UE is camped or connected to a cell operating in the second frequency band $S_B$.

14 Claims, 8 Drawing Sheets

(51) Int. Cl.
*H04M 1/725* (2006.01)
*H04W 8/22* (2009.01)
*H04W 88/06* (2009.01)

(56) References Cited

U.S. PATENT DOCUMENTS

| | | | | |
|---|---|---|---|---|
| 2004/0228321 | A1* | 11/2004 | Koo | 370/350 |
| 2009/0252097 | A1 | 10/2009 | Iyer et al. | |
| 2009/0303941 | A1* | 12/2009 | Naka | H04L 5/023 370/329 |
| 2010/0291882 | A1* | 11/2010 | Hu et al. | 455/73 |
| 2010/0317356 | A1* | 12/2010 | Roessel et al. | 455/450 |
| 2012/0009963 | A1* | 1/2012 | Kim et al. | 455/509 |
| 2012/0093092 | A1* | 4/2012 | Kasslin | H04W 72/082 370/329 |
| 2014/0256325 | A1* | 9/2014 | Hoirup | H04B 1/0458 455/436 |

FOREIGN PATENT DOCUMENTS

| | | |
|---|---|---|
| WO | 2009025608 A1 | 2/2009 |
| WO | 2010146424 A1 | 12/2010 |

OTHER PUBLICATIONS

Third Generation Partnership Project. "Technical Specification Group Radio Access Network; User Equipment (UE) radio transmission and reception (TDD) (Release 9)." Mar. 2010; pp. 1-214; 3GPP TS 25.102 V9.1.0; Sophia Antipolis, Valbonne, France.

Third Generation Partnership Project. "Technical Specification Group Radio Access Network; Evolved Universal Terrestrial Radio Access (E-UTRA); Base Station (BS) radio transmission and reception (Release 9)." Sep. 2012; pp. 1-97; 3GPP TS 36.104 V9.13.0; Sophia Antipolis, Valbonne, France.

Third Generation Partnership Project. "Technical Specification Group Radio Access Networks; Universal Terrestrial Radio Access (UTRA) and Evolved Universal Terrestrial Radio Access (E-UTRA): Extended UMTS / LTE 800 Work Item Technical Report (Release 9)." Sep. 2009; pp. 1-40, 3GPP TR 36.800 V9.0.0 ; Sophia Antipolis, Valbonne, France.

Third Generation Partnership Project. "Technical Specification Group Radio Access Network; Base Station (BS) radio transmission and reception (FDD) (Release 9)." Jun. 2010; pp. 1-88; 3GPP TS 25.104 V9.4.0; Sophia Antipolis, Valbonne, France.

Third Generation Partnership Project. "Technical Specification Group Radio Access Network; Evolved Universal Terrestrial Radio Access (E-UTRA); User Equipment (UE) radio transmission and reception (Release 9)." Jun. 2010; pp. 1-183; 3GPP TS 36.101 V9.4.0; Sophia Antipolis, Valbonne, France.

Third Generation Partnership Project. "Technical specification Group Radio Acess Network; User Equipment (UE) radio transmission and reception (FDD) (Release 9)." Jun. 2010; pp. 1-246; 3GPP TS 25.101 V9.4.0; Sophia Antipolis, Valbonne, France.

Third Generation Partnership Project. "Technical Specification Group GSM/EDGE Radio Access Network; Radio transmission and reception (Release 1999)." Nov. 2005; pp. 1-100; 3GPP TS 05.05 V8.20.0; Sophia Antipolis, Valbonne, France.

Third Generation Partnership Project. "Technical Specification Group Radio Access Network; Base Station (BS) radio transmission and reception (TDD) (Release 10)." Jun. 2010; pp. 1-118; 3GPP TS 25.105 V10.0.0; Sophia Antipolis, Valbonne, France.

* cited by examiner

METHODS AND ARRANGEMENTS IN CELLULAR COMMUNICATION SYSTEMS

TECHNICAL FIELD

The present disclosure relates to methods and arrangements in cellular communication systems. In particular, methods and arrangements are disclosed for handling communication between a user equipment supporting a first frequency band and a network utilizing a second frequency band.

BACKGROUND

A frequency band or an operating frequency band may support a specific duplex mode of operation. Examples of possible duplex modes are: frequency division duplex (FDD), time division duplex (TDD) and half duplex FDD (HD-FDD).

In frequency division duplex (FDD) mode of operation, which is used in Universal Terrestrial Radio Access Network (UTRAN) FDD and Evolved Universal Terrestrial Radio Access Network (E-UTRAN) FDD, the uplink and downlink transmission take place on different carrier frequency channels. Therefore, in FDD mode both uplink and downlink transmission can occur simultaneously in time. On the other hand in time division duplex (TDD) mode, which is used in UTRAN TDD and E-UTRAN TDD, the uplink and downlink transmission take place on the same carrier frequency channel but in different time slots or sub-frames. Half duplex FDD (HD-FDD) that is used in Global System for Mobile communications (GSM) can be regarded as a hybrid scheme where the uplink and downlink are transmitted on different carrier frequencies and are also transmitted on different time slots. This means that uplink and downlink transmission do not occur simultaneously in time.

One primary objective of the standardization of next generation of mobile telecommunications systems in 3rd Generation Partnership Project (3GPP) is to develop a frequency band, which can preferably be used globally or at least in large number of countries. A global or regional band leads to several advantages in terms of global roaming, reduced cost of the products due to the economy of scale, simplicity in building products/devices since the same or at least limited platforms/devices can be reused globally or regionally etc. However certain country specific and even operator specific frequency bands are unavoidable due to the fact that the spectrum availability for the mobile services may be fragmented in different countries and even within a country. Furthermore, the regulators in each country independently allocate the frequency band in accordance with the available spectrum. Also the spectrum below 1 GHz, due to its very promising propagation characteristics, might be scarce or fragmented due to higher demand by other competing technologies. Hence there might be several smaller frequency bands even in the same frequency range allocated in different parts of the world. These local or operator specific bands may partially overlap or may be adjacent in frequency. The assigned spectrum will eventually be standardized in 3GPP in terms of frequency bands so that vendors can develop the products e.g. base stations and user equipments. The standardization of a frequency band encompasses various aspects including the band numbering, raster, carrier frequency channel numbering, user equipment and base station radio requirements, user equipment and base station performance requirements, Radio Resource Management (RRM) requirements etc.

For example, several bands are standardized and allocated in various parts of the world in 800 MHz range for UTRAN FDD and E-UTRAN FDD e.g. bands 5, 6, 18 and 19. Some of the individual frequency bands within 800 MHz range are shown in FIG. 1a-1d. In band 5, which is used in America, Australia and a few countries in Asia and illustrated in FIG. 1a, 824-849 MHz 10a is allocated for uplink and 869-894 MHz 11a is allocated for downlink. In band 6, which is used in Japan and illustrated in FIG. 1b, 830-840 MHz 10b is allocated for uplink and 875-885 MHz 11b is allocated for downlink. In band 18, which is also used in Japan, operator specific and illustrated in FIG. 1c, 815-830 MHz 10c is allocated for uplink and 860-875 MHz 11c is allocated for downlink. In band 19, which is also used in Japan, operator specific and illustrated in FIG. 1d, 830-845 MHz 10d is allocated for uplink and 875-890 MHz 11d is allocated for downlink.

It can be observed from FIG. 1a-1d that either these bands overlap or are adjacent. Secondly most of them are country or even operator specific. Therefore in 3GPP there has been an extensive effort to develop one or two harmonized frequency bands in the 800 MHz range, which could cover all or most of the bands within this frequency range.

Figure 1A:
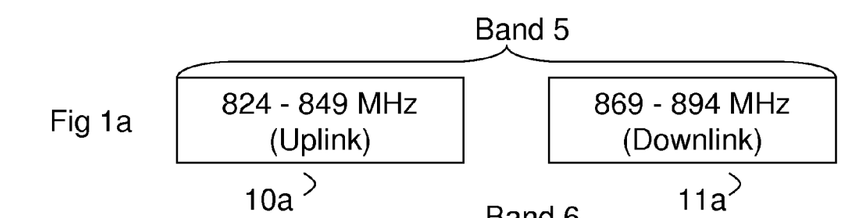
FIGS. 1a-1d illustrate several individual frequency bands within the 800 MHz range.
Figure 1B:
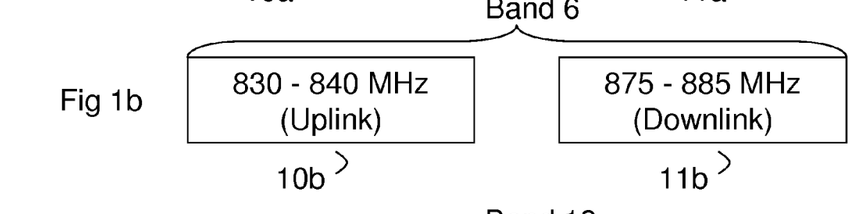
Figure 1C:
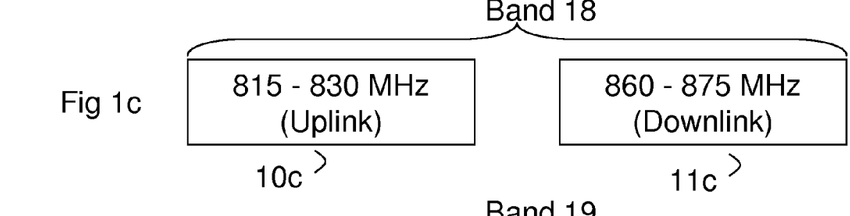
Figure 1D:
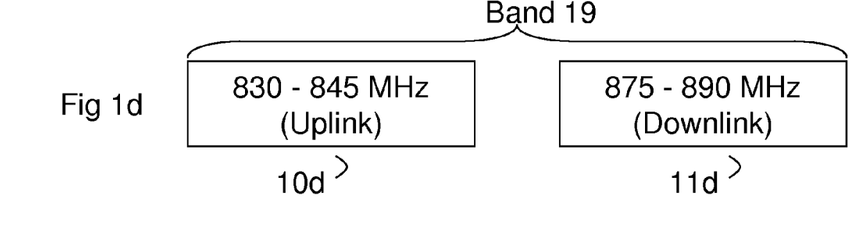
Figure 2A:
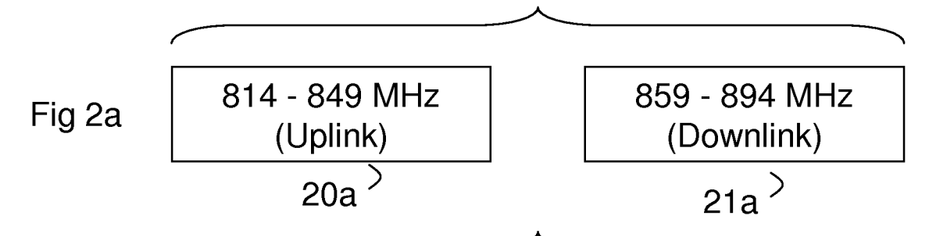
FIGS. 2a-2b illustrate examples of possible harmonized bands in the 800 MHz range.
Figure 2B:
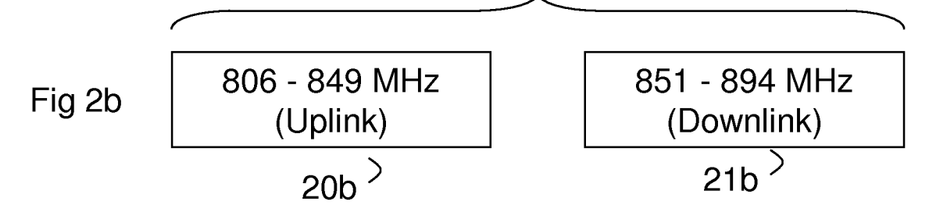

The term 'harmonized band' stems from the fact that it is the super-set or that it covers more than one smaller or individual frequency band in the frequency range. Examples of possible harmonized bands in the 800 MHz range are shown in FIGS. 2a-2b. In the example of a harmonized band currently studied in 3GPP and illustrated in FIG. 2a, 814-849 MHz 20a is allocated for uplink and 859-894 MHz 21a is allocated for downlink. In another example of a harmonized band currently studied in 3GPP and illustrated in FIG. 2b, 806-849 MHz 20b is allocated for uplink and 859-894 MHz 21b is allocated for downlink. The harmonized bands in FIGS. 2a and 2b cover all the frequency bands illustrated in FIG. 1a-1d.

The user equipment/terminal capable of supporting a harmonized band should be able to operate in several of these specific or individual bands. This will lead to lower user equipment costs since specific hardware for an individual band in this range, e.g. 800 MHz, is not required. Furthermore, all operators holding spectrum in the same frequency range would be able to easily get sufficient terminals facilitating their network operation. The terminals supporting the harmonized band must also be compliant to the regulatory requirements in the legacy bands in order to operate in these.

The harmonization of frequency bands is possible in any frequency range, which contains more than one smaller or fragment bands e.g. in 1900 MHz range. Another frequency range being considered for the harmonization is 700 MHz, which is currently fragmented into several smaller operator specific bands.

In order to simplify the frequency search or the so-called initial cell search the center frequency of a radio channel is specified to be an integral multiple of a well defined, generally fixed number, called channel raster. This enables the user equipment to tune its local oscillator only at one of the raster points assuming it to be the center frequency of the channel being searched.

The channel raster in UTRAN FDD is 200 KHz but for certain channels and bands it is also 100 KHz. In E-UTRAN FDD and TDD channel raster for all channels, i.e. all bandwidths, is 100 KHz. The channel raster directly impacts the channel numbering, which is described in the following.

The carrier frequencies in a frequency band are enumerated. The enumeration is standardized such that the combination of the frequency band and the carrier frequency can be determined by a unique number called absolute radio frequency number. In GSM, UTRAN and E-UTRAN the channel numbers are called Absolute Radio Frequency Channel Number (ARFCN), UTRA Absolute Radio Frequency Channel Number (UARFCN) and E-UTRA Absolute Radio Frequency Channel Number (EARFCN), respectively.

In FDD systems separate channel numbers are specified for uplink (UL) and downlink (DL). In TDD there is only one channel number since the same frequency is used in both directions.

The channel numbers, e.g. EARFCN, for each band are unique in order to distinguish between different bands. The channel number for each band can be derived from the expressions and mapping tables defined in the relevant specifications. Based on the signalled channel numbers, e.g. EARFCN in E-UTRAN, and the pre-defined parameters associated with each band the user equipment can determine the actual carrier frequency in MHz and the corresponding frequency band. This is explained by the following example.

For example the relation between the EARFCN and the carrier frequency $F_{DL}$ in MHz for the downlink is pre-defined by the following equation:

$$F_{DL}=F_{DL\_low}+0.1(N_{DL}-N_{Offs-DL})$$

Where $F_{DL\_low}$ and $N_{Offs-DL}$ are pre-defined values for each band and $N_{DL}$ is the downlink EARFCN.

Consider E-UTRAN band 5, whose EARFCN range $N_{DL}$ lies between 2400-2649 MHz. The pre-defined values of $F_{DL\_low}$ and $N_{Offs-DL}$ are 869 MHz and 2400 MHz, respectively. Assume that the network signals that downlink EARFCN is 2500 MHz. Using the above expression the user equipment can determine that the downlink carrier frequency of the channel is 879 MHz. Furthermore as stated above, the pre-defined EARFCN range is unique for each band. Hence, the user equipment can determine the frequency band corresponding to the signalled EARFCN. An expression to derive the E-UTRAN FDD uplink carrier frequency, which is similar to that of the downlink carrier frequency, is also pre-defined. In E-UTRAN FDD both fixed transmit-receive frequency separation, i.e. fixed duplex, and variable transmit-receive frequency separation, i.e. variable duplex, are supported. If fixed transmit-receive frequency separation is used by the network then the network does not have to signal the uplink EARFCN since the user equipment can determine the uplink carrier frequency from the downlink carrier frequency and the pre-defined duplex gap. In case the variable duplex is employed by the network for a certain band then both downlink and uplink EARFCN have to be signalled.

For the initial cell search or more specifically for the initial carrier frequency search the user equipment has to search at all possible raster frequencies e.g. with 100 KHz resolution in the E-UTRAN frequency band. However, for the user equipments camped on or connected to the cell, the network signals the absolute radio frequency channel number(s) for performing measurements, mobility decisions such as cell reselection or commanding handover to certain cell belonging to certain frequency channel of the same or of a different radio access technology (RAT) etc. Hence, the user equipment can, after camping on a cell in idle mode or when connected to a cell in connected mode, acquire the cell specific or user equipment specific system information, which contains the absolute radio frequency channel number(s).

The network can request the user equipment to perform handover to a cell operating on another carrier frequency i.e. an inter-frequency handover or to a cell belonging to another RAT i.e. an inter-RAT handover. The inter-frequency or inter-RAT handover is performed to a cell on a carrier frequency, which may or may not belong to the frequency band of the serving cell. In both handover scenarios, the carrier frequencies of the serving cell and the target cells are different. Therefore, in order to assist the UE to perform the inter-frequency or inter-RAT handover the network signals the frequency channel number of the target carrier frequency in the handover command.

According to state of the art solutions the user equipment supporting a harmonized frequency band, which overlaps with one or more individual smaller legacy frequency bands, will implement the carrier frequency channel numbers and other relevant information related to the harmonized band, which harmonized band is denoted $H_B$.

In the past UTRAN FDD and E-UTRAN FDD band 6 used in Japan was extended by 5 MHz. The new extended UTRAN FDD and E-UTRAN FDD band 6 is called UTRAN FDD and E-UTRAN FDD band 19. Hence band 19, which is the super-set of band 6, can be regarded as the harmonized band with respect to band 6. The entire band 19 is country specific. It has therefore been specified that band 6 is not applicable. This means that the network will only implement band 19. This solution as used for bands 6/19 is not possible for a harmonized band, which overlaps with several individual bands in several countries and an individual band may also be owned by more than one operator. Thus, it is not likely that all operators using the individual band would refarm their legacy network to the new harmonized band.

Individual bands overlapping with the harmonized band, e.g. in the 800 MHz range, will exist in various parts of the world. This is because the frequency assignment in different parts of the world may be different and therefore it is not likely that all networks in different parts of the world will implement the new harmonized band. However, there will be several user equipments capable of supporting the harmonized band as this will reduce the cost and avoid the need for user equipments with separate implemented hardware for each individual band. However, a user equipment supporting the harmonized band will not be able to recognize relevant information of the smaller legacy bands. Furthermore, a user equipment, which is capable of supporting a harmonized band $H_B$, entering in a network using future smaller individual bands $S_B$ will not be able to recognize relevant information of the future smaller individual bands.

SUMMARY

The object of the present invention is to address some of the problems and disadvantages outlined above, and to provide methods and arrangements for enabling a user equipment supporting a first frequency band to communicate with a network utilizing a second frequency band which is a sub-set of or overlaps with the first frequency band.

The above stated object is achieved by means of the methods and the arrangements according to the independent claims, and by the embodiments according to the dependent claims.

In accordance with a first aspect of embodiments, a method in a user equipment which is arranged to communicate with a network node comprised in a cellular communication system is provided. The user equipment is configured to support a first frequency band. The method comprises acquiring at least one parameter related to at least one second frequency band. The method further comprises determining the at least one second frequency band to which the acquired at least one parameter corresponds, wherein the at least one second frequency band is a sub-band of the first frequency band or overlaps with the first frequency band. The method includes implementing a channel numbering scheme related to the at least one second frequency band. Furthermore, the method comprises communicating with the network node on the at least one second frequency band.

In accordance with a second aspect of embodiments, a method in a network node comprised in a cellular communication system is provided. The network node is arranged to communicate with a user equipment. The user equipment is configured to support a first frequency band. The method comprises receiving an indication from the user equipment that the user equipment is able to recognize a channel numbering scheme related to at least one second frequency band. The at least one second frequency band is a sub-band of the first frequency band or overlaps with the first frequency band. The method comprises determining if the at least one second frequency band is used in the network node. If the at least one second frequency band is used, the method further comprises sending to the user equipment at least one parameter related to the at least one second frequency band. The method further includes communicating with the user equipment on the at least one second frequency band.

In accordance with a third aspect of embodiments, a method in a network node comprised in a cellular communication system is provided. The network node is arranged to communicate with a user equipment and the user equipment is configured to support a first frequency band. The method comprises receiving a report from the user equipment that the user equipment has first frequency band capability. The method further includes sending to the user equipment at least one parameter related to at least one second frequency band, wherein the at least one second frequency band is a sub-band of the first frequency band or overlaps with the first frequency band. Additionally, the method comprises communicating with the user equipment on the at least one second frequency band.

In accordance with a fourth aspect of embodiments, a user equipment configured to communicate with a network node comprised in a cellular communication system and configured to support a first frequency band is provided. The user equipment comprises a processor adapted to acquire at least one parameter related to at least one second frequency band. The processor is further adapted to determine the at least one second frequency band to which the acquired at least one parameter corresponds. The at least one second frequency band is a sub-band of the first frequency band or overlaps with the first frequency band. Moreover, the processor is adapted to implement a channel numbering scheme related to the at least one second frequency band. The user equipment further comprises a transceiver adapted to communicate with the network node on the at least one second frequency band.

In accordance with a fifth aspect of embodiments, a network node configured to be used in a cellular communication system and to communicate with a user equipment is provided. The user equipment is configured to support a first frequency band. The network node comprises a transceiver adapted to receive an indication from the user equipment that the user equipment is able to recognize a channel numbering scheme related to at least one second frequency band. The at least one second frequency band is a sub-band of the first frequency band or overlaps with the first frequency band. The network node further comprises a processor adapted to determine if the at least one second frequency band is used in the network node. If the at least one second frequency band is used in the network node, the transceiver is further adapted to send to the user equipment at least one parameter related to the at least one second frequency band. Additionally, the transceiver is adapted to communicate with the user equipment on the at least one second frequency band.

In accordance with a sixth aspect of embodiments, a network node configured to be used in a cellular communication system and to communicate with a user equipment is provided. The user equipment is configured to support a first frequency band. The network node comprises a transceiver adapted to receive a report from the user equipment that the user equipment has first frequency band capability. The transceiver is further adapted to send to the user equipment at least one parameter related to at least one second frequency band, wherein the at least one second frequency band is a sub-band of the first frequency band or overlaps with the first frequency band. In addition, the transceiver is adapted to communicate with the user equipment on the at least one second frequency band.

An advantage of particular embodiments is that they provide a solution to the stated object which enables that the user equipment supporting a harmonized band can operate in a network operating in a band, which is smaller and overlaps with or is a sub-band of the harmonized band.

Another advantage of particular embodiments is that the user equipment supporting a harmonized band can roam to a legacy band, which is a sub-set of the harmonized band.

A further advantage of particular embodiments is that the user equipment supporting a harmonized band can roam and/or operate in a band, which is a sub-set of the harmonized band introduced in the future.

Further advantages and features of embodiments will become apparent when reading the following detailed description in conjunction with the drawings.

BRIEF DESCRIPTION OF THE DRAWINGS

For a better understanding, reference is made to the following drawings and preferred embodiments.

DETAILED DESCRIPTION

In the following description, for purposes of explanation and not limitation, specific details are set forth, such as particular sequences of steps and particular device configurations in order to provide a thorough understanding of the embodiments. It will be apparent to one skilled in the art that the embodiments may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the embodiments of the present disclosure are primarily described in the form of methods and devices, the embodiments may also be embodied or implemented in a computer program product as well as a system comprising a computer processor and a memory coupled to the processor, wherein the memory is encoded with one or more programs that may perform the functions disclosed herein.

Among several things the following disclosure relates to enabling operation and roaming of a user equipment supporting a harmonized frequency band, i.e. a first frequency band, in a smaller frequency band, i.e. a second frequency band, which is a sub-set of or overlaps with the harmonized frequency band. It should be noted that the term 'harmonized band' stems from the fact that it is the super-set or that it covers more than one smaller or individual frequency band in the frequency range. The individual frequency band is a sub-set of the harmonized frequency band or overlaps with the frequency band, e.g. it may lie partly over the harmonized frequency band.

As mentioned above, a user equipment supporting a harmonized frequency band, which overlaps with one or more individual smaller legacy frequency bands, will implement the carrier frequency channel numbers and other relevant information related to the harmonized band $H_B$. The user equipment supporting a harmonized frequency band is provided with hardware which supports communication in the harmonized frequency band.

This will have the following consequences when such a user equipment enters the network supporting any of the individual smaller bands, which individual bands, denoted $S_B$, are overlapping or partly overlapping with the harmonized band $H_B$:

The user equipment can perform cell search, identify a cell and read system information of the cell operating in the individual band $S_B$. But even then the UE will not be able to identify the carrier frequency channel number used in the cell.

The user equipment will not be able to identify the individual frequency band $S_B$ used in the cell.

The user equipment cannot perform cell reselection or handover to a carrier frequency belonging to any of the smaller individual bands $S_B$ even if the user equipment is operating in a cell using the harmonized band $H_B$. This is because the UE cannot recognize the channel numbers of the individual bands $S_B$.

The overall consequence is that the user equipment capable of supporting the harmonized band $H_B$ cannot adequately operate in a smaller individual band $S_B$, which overlaps with the harmonized band $H_B$.

Hence, a user equipment supporting the harmonized band will not be able to recognize the carrier frequency channel numbers and other relevant information of the smaller legacy bands.

The problem will be even more severe for the user equipment, which is capable of supporting a harmonized band $H_B$, entering in a network using smaller individual bands $S_B$ standardized in the future. The present disclosure comprises a set of rules to ensure that the user equipment (UE) supporting the harmonized frequency band $H_B$ can fully operate in a smaller individual band, which overlaps with the harmonized band. The embodiments suggest the UE, which supports harmonized band and is able to implement the channel numbering scheme of the harmonized band to actually implement the channel numbering scheme of the at least one individual band, which overlaps with the harmonized band. This enables the UE supporting the harmonized band to recognize the individual frequency band when the UE is camped or connected to a cell operating in the individual band or when the relevant information for the individual band is provided to the UE.

According to an exemplary embodiment the UE supports a harmonized band $H_B$ and at least one parameter related to the numbering scheme of at least one of the individual legacy bands $S_B$. An individual band $S_B$ overlaps with or is a sub-set or sub-band of a harmonized band $H_B$. It should be noted that the embodiments require the UE to implement only the channel numbering scheme of the individual band $S_B$ and not to meet the radio requirements of the individual bands $S_B$. Indeed the objective of the harmonization of the band is that the UE has to implement one large harmonized band $H_B$ to operate in one or more individual band $S_B$ without implementing these individual bands, i.e. without requiring separate hardware for the individual bands.

The method in the UE capable of supporting a harmonized band comprises the steps of:

Acquiring at least one parameter, e.g. channel number, EARFCN in E-UTRAN related to at least one individual band $S_B$, which overlaps with the harmonized band $H_B$, Determining that the acquired at least one parameter corresponds to the individual band $S_B$, which overlaps with the harmonized band $H_B$, Determining the individual band $S_B$.

The method in the UE capable of supporting the harmonized band further comprises the steps of:

Communicating with the network by using the at least one parameter related to the individual band $S_B$, e.g. where the at least one parameter is a channel number of the individual frequency band $S_B$, when the network operates in the individual band $S_B$.

The network corresponds to any set of network nodes. Examples of the network nodes are a core network node, e.g. Mobility Management Entity (MME) and an eNodeB base station in E-UTRAN; a core network node, a Radio Network Controller (RNC) and a NodeB base station in UTRAN.

As stated above, in order to determine the individual legacy band from the acquired information, i.e. from the at least one parameter related to at least one individual band $S_B$, the UE has to implement the channel numbering scheme related to the individual band, which is specified in the standard.

The method allows the UE supporting the harmonized band $H_B$ to fully recognize the individual band $S_B$. Hence, when operating in a network operating in the legacy individual band $S_B$, the UE can transparently communicate and operate using the channel numbering scheme of the individual band $S_B$.

The UE typically reports its band capability to the network in prior art. Hence the UE will indicate its band capability of the harmonized band $H_B$ to the network. However, the solution in this embodiment is transparent to the network in a sense that the UE, which is capable of supporting the harmonized band $H_B$, communicates with the network using the channel numbering scheme corresponding to the individual band $S_B$. Hence, from the network perspective the UE is perceived as operating in an individual band $S_B$.

According to an exemplary embodiment a rule can be pre-defined in a standard that the UE capable of supporting a harmonized band $H_B$ shall implement also the channel numbering scheme of one or more individual legacy bands $S_B$. For example, it can be pre-defined that the UE supporting harmonized 800 MHz band supports the channel numbering scheme, e.g. all parameters such as EARFCN, channel raster etc associated with or which defines a band, for bands 5, 6, 18 and 19. The UE thus only reports to the network that it supports the harmonized band $H_B$. Hence, the legacy network can use the channel numbering scheme of the individual legacy band $S_B$ when the UE is operating in the harmonized band $H_B$.

This embodiment does not affect the legacy network, i.e. no modification to network, using one of the individual bands $S_B$, which is the sub-set of the harmonized band supported by one or more UEs currently connected to the legacy network.

According to another exemplary embodiment the UE also explicitly signals a set of capability information to the network, the capability information indicating that the UE supports the harmonized band $H_B$, and that the UE is also able to recognize the channel numbering schemes of one or more individual bands $S_B$, which overlap with or are sub-set of the said harmonized band $H_B$.

For example, the UE reports to the network that it supports the harmonized 800 MHz band and also indicates that it supports or is able to recognize the channel numbering scheme for bands 5, 6, 18 and 19 such that it can operate in these sub-bands using their own channel numbering schemes. In this option there could be a mixture of the harmonized band capable UEs, i.e. some harmonized band capable UEs which supports or are able to recognize the channel numbering scheme of one or more of the legacy individual or individual bands $S_B$, and some harmonized band capable UEs which do not support or are not able to recognize the channel numbering scheme of one or more of the legacy individual or individual bands $S_B$.

The network may take one or more actions. For example, the network may not allow the operation of those UEs, which are not capable of supporting or recognizing the channel numbering schemes of the individual or legacy individual bands $S_B$ used in the network. In this case the network sends a failure message to the UE wherein the failure message forbids UE to operate in the network which is using the individual band $S_B$. The second possibility is that the network signals the channel numbers of the operating carrier frequency corresponding to both the harmonized band $H_B$ and at least one individual or legacy individual band $S_B$ currently used. This will enable the UEs, which support only the harmonized band, i.e. UEs which do not support legacy individual or individual band $S_B$, to implement the channel numbering scheme specified for the individual or legacy individual band $S_B$.

In reality the currently used band in the legacy network is one of the individual or legacy individual bands $S_B$. The second possibility requires that the network using one of the individual or legacy individual bands $S_B$ signals the channel numbering scheme of the individual or legacy individual band to the UE in the system information, i.e. over broadcast channel and over UE specific channel.

New frequency bands are standardized for the mobile services as the spectrum becomes available and demand increases in different parts of the world. Hence in future smaller or individual frequency bands $S_B$, which are sub-set of a harmonized larger band $H_B$, are likely to be standardized. Every band has its own channel numbering scheme. Hence the future bands $S_B$, which are subset of a harmonized band $H_B$, will use a new channel numbering scheme, which will not be recognizable by the legacy UE, i.e. UEs which are also built prior to the introduction of the new individual band $S_B$. Hence a legacy UE supporting a harmonized band $H_B$ will not be able to recognize the individual band $S_B$, which is standardized at a later stage i.e. after the UE supporting harmonized band $H_B$ is rolled out.

Thus, a legacy UE supporting the harmonized band $H_B$ will not be able to operate in the network operating in such an individual band $S_B$, e.g. which is introduced after the UE supporting the harmonized band $H_B$ is in the market.

However, the UE can still perform the cell search to identify the cell and camp on the identified cell. But as the UE will not be able to recognize the channel number signaled by the camped cell, the network cannot communicate with the UE, i.e., UE cannot perform cell reselection, handover etc.

To resolve the above problem the following exemplary embodiment describes a method in both a UE and a network node.

The method in the UE comprises the steps of:
Performing the cell search to identify a cell,
Acquiring system information to determine whether the identified cell operates on a frequency band, e.g. by reading the signaled channel number of the operating carrier frequency, which is supported by the UE,
Reporting frequency band $H_B$ capability of the UE to the network even if the UE does not support or recognize the frequency band of the identified cell,
Receiving a set of information from the network node wherein the information comprises at least one parameter to determine the channel numbering scheme corresponding to the frequency band $S_B$, which is used by the identified cell.
Operating or communicating with the network using the signaled numbering scheme of the frequency band $S_B$.

The corresponding method in the network node, e.g. core network or eNode B, comprises the steps of:
Receiving the UE's frequency band $H_B$ supporting capability information from the UE. The UE sends the frequency band $H_B$ supporting capability information using or via the cell identified by the UE and which cell belongs to the network,
Configuring the UE with a channel numbering scheme corresponding to the frequency band $S_B$ currently used by the network in case the frequency band $S_B$ used by the network is not supported by the UE and the used frequency band $S_B$ is the sub-set of the frequency band $H_B$ supported by the UE.
Communicating with the UE using the channel numbering scheme of the frequency band $S_B$ signaled to the UE.

Consequently, the UE is semi-statically configured by the network with a new frequency band $S_B$, i.e. associated information e.g. channel number ranges etc, over which the UE can operate with the existing hardware capability. The UE supported harmonized frequency band $H_B$ is the superset of the new/future individual frequency band $S_B$. Hence the UE hardware capability should be capable of supporting the semi-statically configured future/individual frequency band $S_B$ from the radio and performance requirements perspective.

In prior art solutions if the UE cannot recognize the channel number, which is signaled from the network in the system information of the cell after identifying the cell, the UE is not able to communicate with the cell. Instead the UE searches other cells, which match its frequency band capability. However, in the disclosed embodiments the UE does report its frequency band capability to the network whenever it suspects that the identified cell is operating on one of the individual bands $S_B$, which is a sub-set of a harmonized frequency band $H_B$ supported by the UE.

Figure 3:
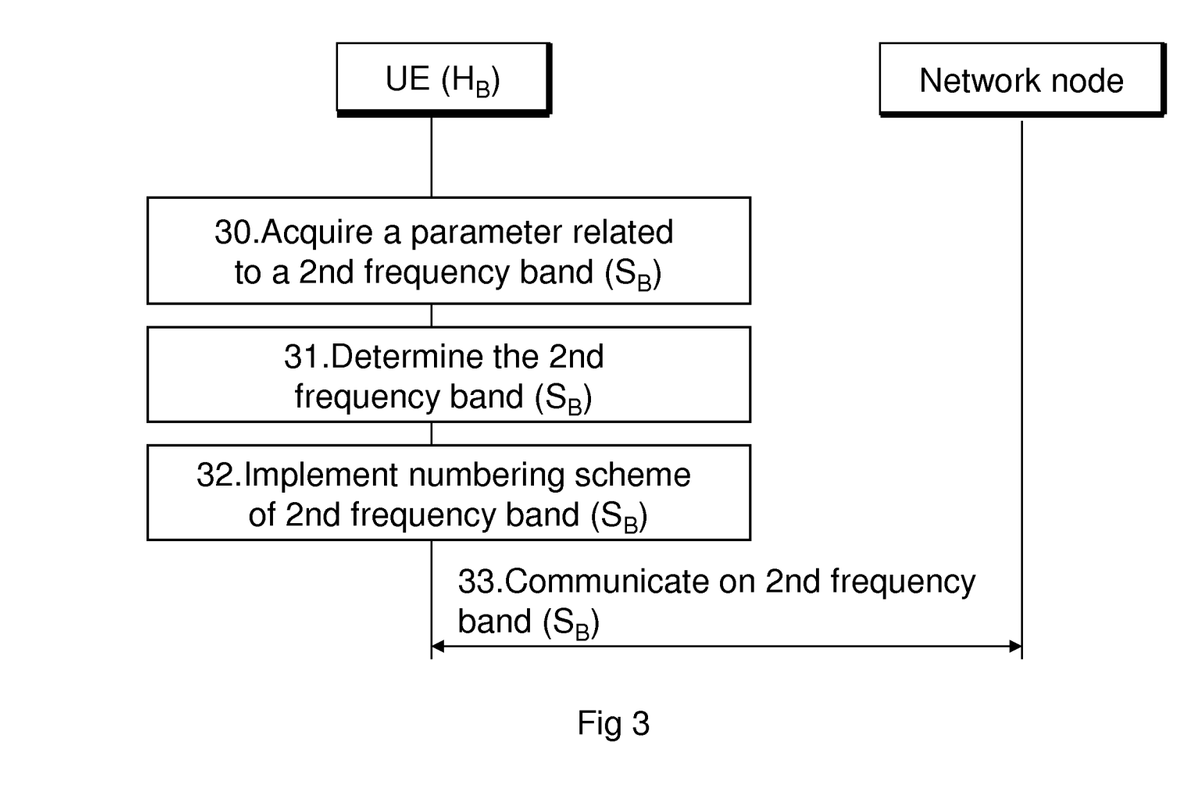
FIG. 3 is a signalling diagram illustrating a method of an exemplary embodiment.

FIG. 3 is a signalling diagram illustrating a method of an exemplary embodiment. According to the illustrated embodiment, a UE supports a first frequency band, i.e. a harmonized frequency band $H_B$. In a step 30, the UE acquires at least one parameter related to at least one second frequency band. The at least one second frequency band is a sub-band of the first frequency band or overlaps with the first frequency band, i.e. the at least one second frequency band is an individual band $S_B$ which overlaps with or is a sub-set of the harmonized band $H_B$.

It should be noted that a harmonized frequency band may cover several individual frequency bands as illustrated in FIGS. 1a-1d and FIGS. 2a-2b. Further, the at least one second frequency band, i.e. the individual frequency band $S_B$, to which the acquired at least one parameter corresponds is determined in step 31. The at least one parameter may, for example, be a channel number related to the numbering scheme of the at least one second frequency band $S_B$, e.g. EARFCN in E-UTRAN, UARFCN in UTRAN etc. The at least one parameter may also be a channel raster of the at least one second frequency band $S_B$. In a further step 32, the UE implements a channel numbering scheme related to the at least one second frequency band and starts communicating with the network node on the at least one second frequency band i.e. the individual frequency band $S_B$ in step 33.

Figure 4:
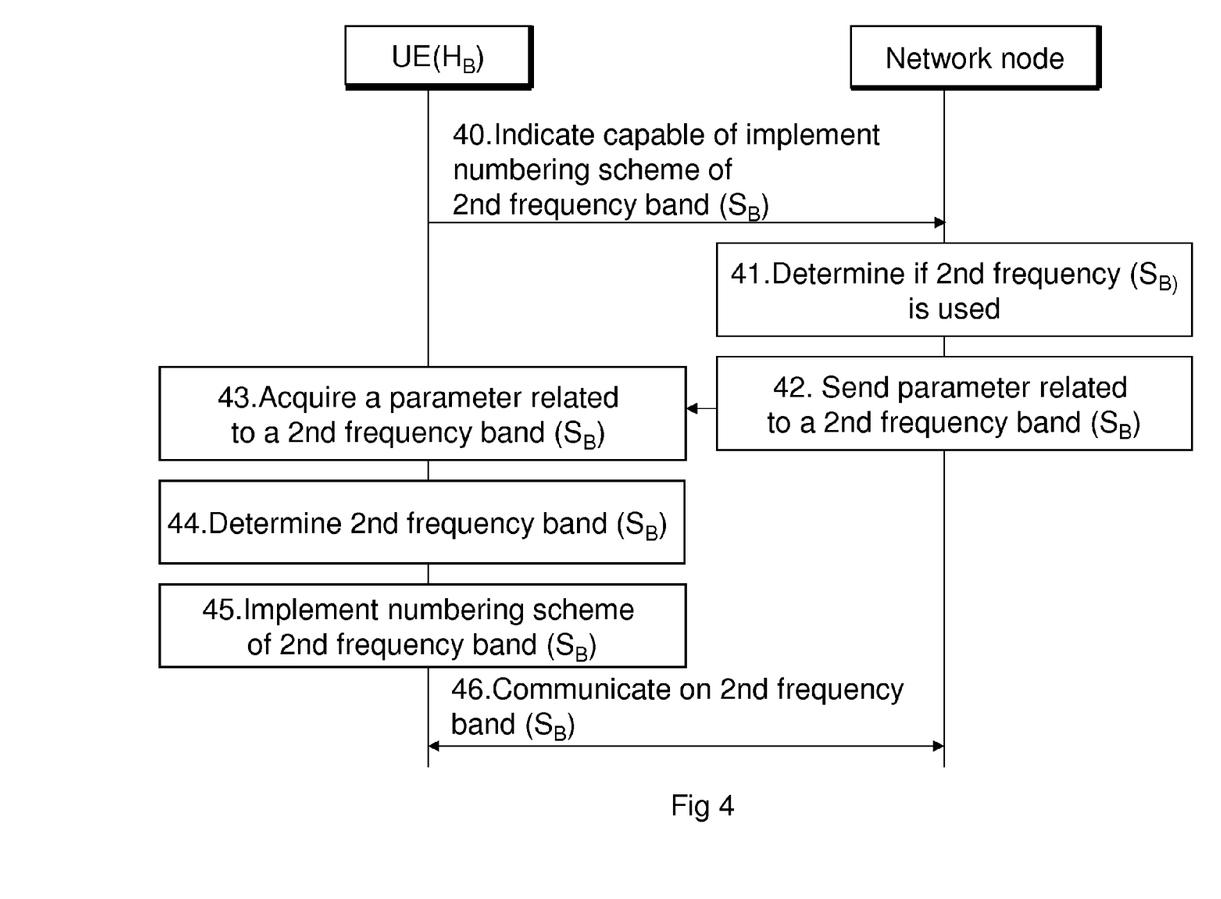
FIG. 4 is a signalling diagram illustrating methods of a further exemplary embodiment.

FIG. 4 is a signalling diagram illustrating methods of a further exemplary embodiment. According to the illustrated embodiment, a UE supports a first frequency band, i.e. a harmonized frequency band $H_B$. The UE explicitly signals a set of capability information to the network. The capability information indicates that the UE supports the harmonized band $H_B$ and that the UE is also able to recognize the channel numbering schemes of one or more individual bands $S_B$, which overlap with or are sub-sets of the harmonized band $H_B$.

Thus, in a step 40 the UE indicates to the network node that the UE is able to recognize the channel numbering scheme related to at least one second frequency band $S_B$. The at least one second frequency band is a sub-band of the first frequency band or overlaps with the first frequency band, i.e. the at least one second frequency band is an individual band $S_B$ which overlaps with or is a sub-set of the harmonized band $H_B$. It should be noted that also in this embodiment a harmonized frequency band may cover several individual frequency bands. Next, the network node determines if the at least one second frequency band is used in the network node in step 41. Moreover, if the network node determines that the at least one second frequency band is used, it sends to the UE, in a step 42, at least one parameter related to the at least one second frequency band i.e. the individual frequency band $S_B$. For example, the at least one parameter may be the channel number of the operating carrier frequency corresponding to the at least one second frequency band, i.e. the individual band $S_B$ currently used. The at least one parameter may, for example, be a channel number, e.g. EARFCN in E-UTRAN, UARFCN in UTRAN etc. The at least one parameter may also be a channel raster. In a step 43, the UE acquires the at least one parameter related to the at least one second frequency band by receiving it from the network node. Further, the at least one second frequency band, i.e. the individual frequency band $S_B$, to which the acquired at least one parameter corresponds is determined in the UE, in step 44. In a further step 45, the UE implements the channel numbering scheme related to the at least one second frequency band and starts communicating with the network node on the at least one second frequency band i.e. the individual frequency band $S_B$ in step 46. In one embodiment when the first frequency band, i.e. the harmonized frequency band, is used in the network, the network node may also send a second parameter, which is related to the first frequency band, i.e. the harmonized frequency band $H_B$, to the UE. The second parameter may indicate that the channel numbering scheme of the first frequency band should be used when the UE communicates with the network. The parameters may be broadcasted or provided on a UE specific channel.

Hence, the method of the embodiment will enable the UE, which support only the harmonized band, i.e. UEs which do not support individual band $S_B$, to operate using the channel numbering scheme specified for the individual band $S_B$.

Figure 5:
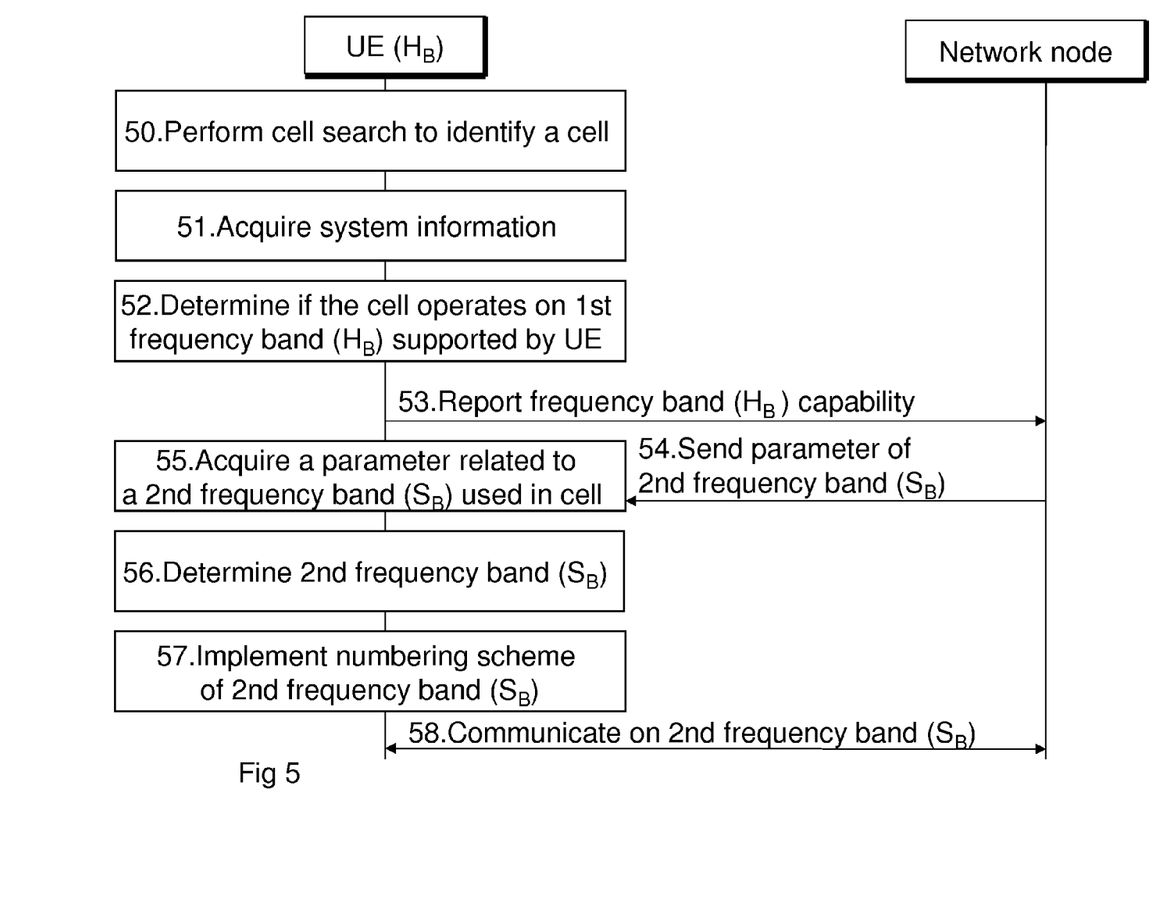
FIG. 5 is a signalling diagram illustrating methods of a yet further exemplary embodiment.

FIG. 5 is a signalling diagram illustrating methods of a yet further exemplary embodiment. According to the illustrated embodiment, a UE supports a first frequency band, i.e. a harmonized frequency band $H_B$. However, the UE does not support individual bands $S_B$, which are standardized at a later stage i.e. after the UE supporting harmonized band $H_B$ is rolled out due to the fact that the future frequency bands $S_B$, which are subsets of the harmonized band $H_B$, will use new channel numbering schemes. It should be noted that also in this embodiment a harmonized frequency band may cover several future individual frequency bands.

In a first step 50, the UE performs a cell search to identify a cell to camp on. After identifying a cell the UE acquires system information is a step 51. In a further step 52, the UE determines based on the acquired system information if the network node serving the identified cell operates on a first frequency band which is supported by the UE, i.e. the harmonized frequency band $H_B$. This may be performed by reading the signaled channel number of the operating carrier frequency sent by the network node serving the cell. Moreover, the UE reports to the network node the first frequency band capability in step 53 even if the UE does not support or recognize the frequency band of the identified cell. The network node receives the report that the UE has first frequency band capability and thereupon sends to the UE, in a step 54, at least one parameter related to at least one second frequency band. The at least one second frequency band is a sub-band of the first frequency band or overlaps with the first frequency band, i.e. the at least one second frequency band is an individual band $S_B$ which overlaps with or is a sub-set of the harmonized band $H_B$. For example, the at least one parameter may correspond to both the first frequency band, i.e. the harmonized band $H_B$, and the at least one second frequency band, i.e. the individual band $S_B$, currently used in the network. The at least one parameter may, for example, be a channel number, e.g. EARFCN in E-UTRAN, UARFCN in UTRAN etc. The at least one parameter may also be a channel raster. In a step 55, the UE acquires the at least one parameter related to the at least one second frequency band by receiving it from the network node. Further, the at least one second frequency band, i.e. the individual frequency band $S_B$, to which the acquired at least one parameter corresponds is determined in the UE, in step 56. In a further step 57, the UE implements the channel numbering scheme related to the at least one second frequency band and starts communicating with the network node on the at least one second frequency band i.e. the individual frequency band $S_B$ in step 58.

Figure 6:
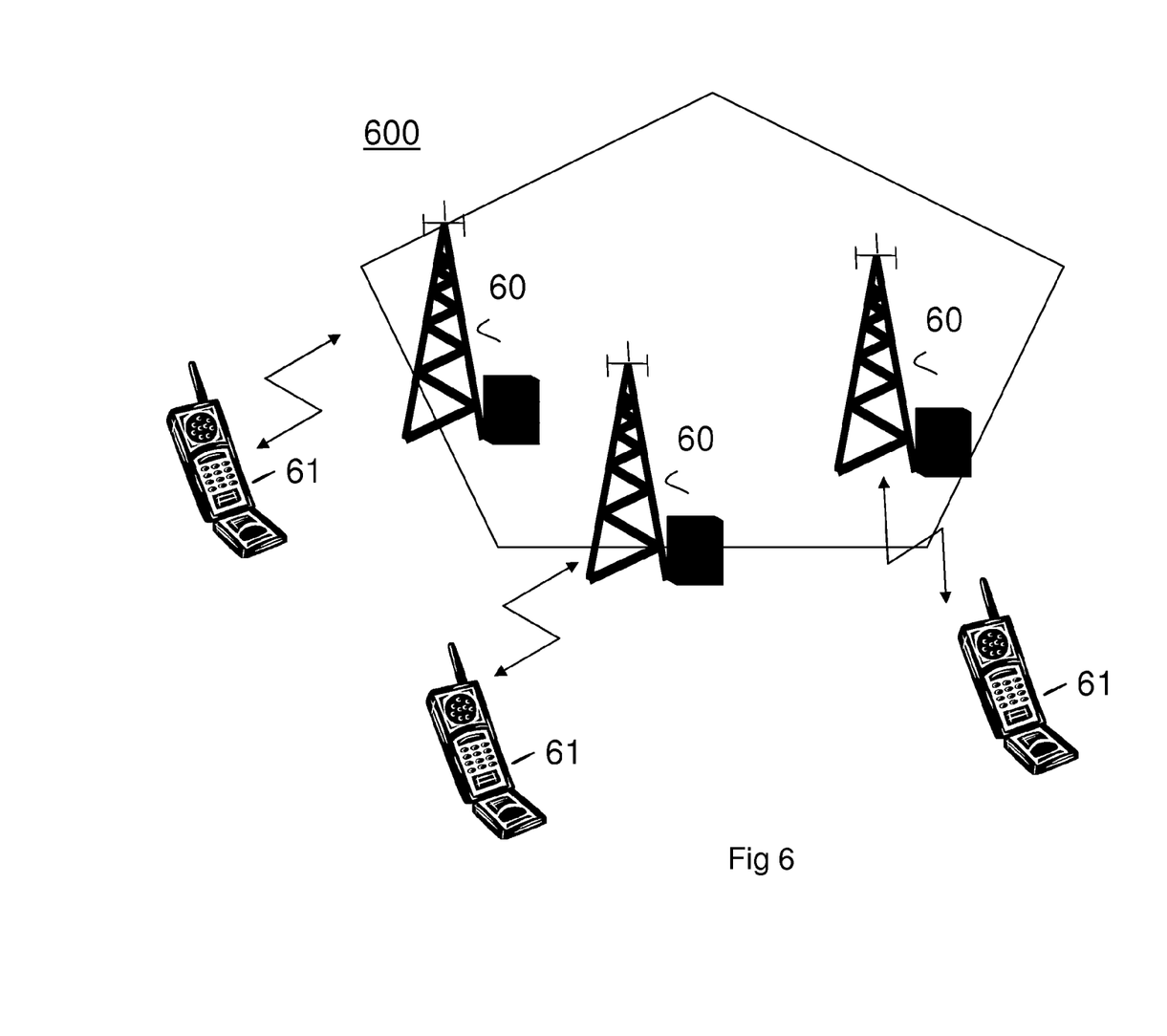
FIG. 6 illustrates schematically a conventional cellular communication system such as an LTE network, wherein embodiments may be implemented.

Although the described embodiments may be implemented in any appropriate type of telecommunication system supporting any suitable communication standards and using any suitable components, particular embodiments may be implemented in a Long Term Evolution (LTE) network, such as the one illustrated in FIG. 6.

Figure 7:
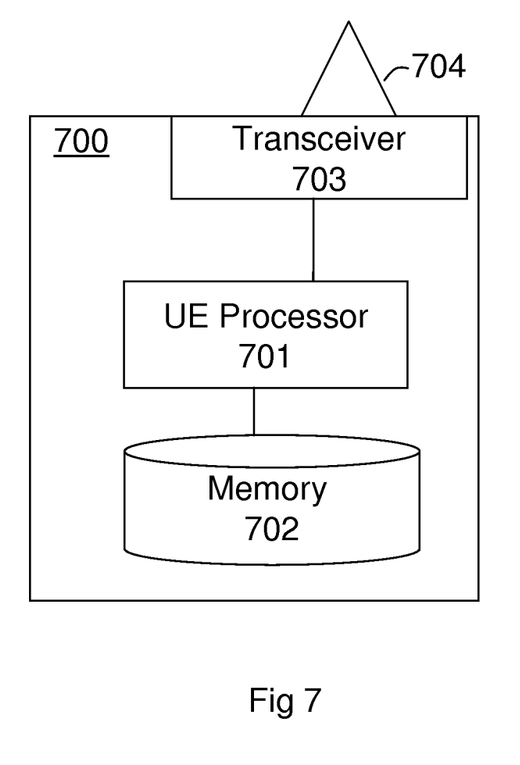
FIG. 7 illustrates schematically a user equipment according to embodiments.

As shown in FIG. 6, the example network 600 may include one or more instances of user equipment (UEs) 61 and one or more base stations 60 capable of communicating with these UEs 61, along with any additional elements suitable to support communication between UEs 61 or between a UE 61 and another communication device, such as a landline telephone. Although the illustrated UEs 61 may represent communication devices that include any suitable combination of hardware and/or software, these UEs 61 may, in particular embodiments, represent devices such as the example UE 61 illustrated in greater detail by FIG. 7. Similarly, although the illustrated base stations 60 may represent network nodes that include any suitable combination of hardware and/or software, these base stations 60 may, in particular embodiments, represent devices such as the example base station 60 illustrated in greater detail by FIG. 8. As shown in FIG. 7, the example UE 700 includes a processor 701, a memory 702, a transceiver 703, and an antenna 704. In particular embodiments, some or all of the functionality described above as being provided by mobile communication devices or other forms of UE may be provided by the UE processor 701 executing instructions stored on a computer-readable medium, such as the memory 702 shown in FIG. 7.

Alternative embodiments of the UE 700 may include additional components beyond those shown in FIG. 7 that may be responsible for providing certain aspects of the UE's functionality, including any of the functionality described above and/or any functionality necessary to support the embodiments described above.

Figure 8:
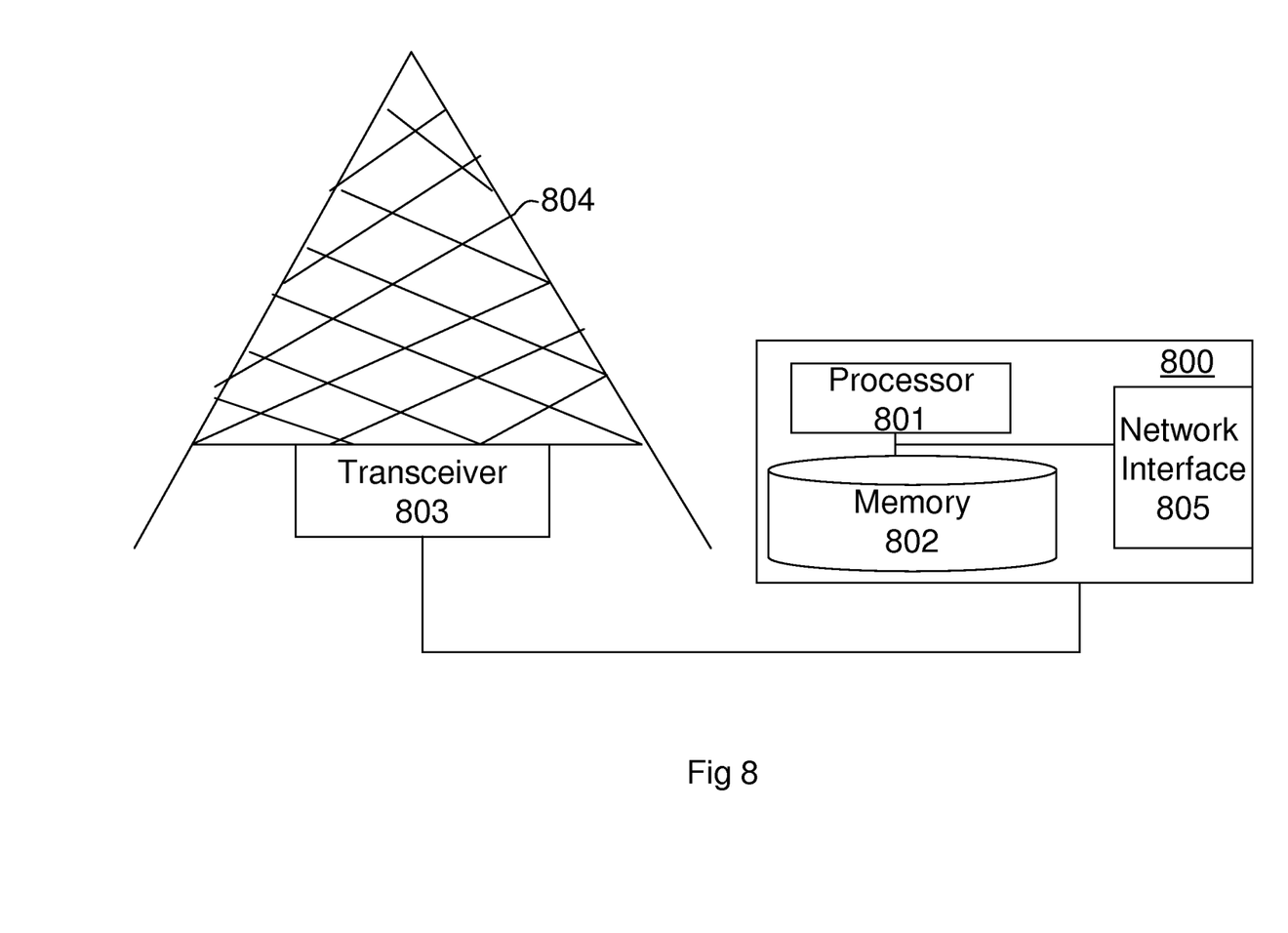
FIG. 8 illustrates schematically a network node according to embodiments.

In an exemplary embodiment, the UE 700 is configured to communicate with the network node 800 comprised in a cellular communication system and configured to support a first frequency band, i.e. a harmonized frequency band $H_B$. The UE 700 comprises a processor 701 adapted to acquire at least one parameter related to at least one second frequency band, i.e. an individual frequency band $S_B$. The processor 701 is further adapted to determine the at least one second frequency band to which the acquired at least one parameter corresponds, wherein the at least one second frequency band, i.e. the individual frequency band $S_B$ is a sub-band of the first frequency band, i.e. the harmonized frequency band $H_B$, or overlaps with the first frequency band. Furthermore, the processor 701 is adapted to implement a channel numbering scheme related to the at least one second frequency band. The UE additionally comprises a transceiver 703 adapted to communicate with the network node 800 on the at least one second frequency band.

In a further exemplary embodiment, the transceiver 703 is further adapted to indicate to the network node 800 that the UE 700 is capable of implementing the channel numbering scheme related to the at least one second frequency band. In addition, it may further be adapted to receive, from the network node 800, the at least one parameter. The at least one parameter is related to the at least one second frequency band, i.e. the individual frequency band $S_B$, and the at least one parameter is further related to the first frequency band, i.e. the harmonized frequency band $H_B$.

In yet a further exemplary embodiment, the processor 701 is further adapted to determine if the network node 800 operates on the first frequency band. Moreover, the transceiver 703 is further adapted to report to the network node 800 that the UE 700 has first frequency band capability. The transceiver 703 may then also be adapted to receive from the network node 800 the at least one parameter related to the at least one second frequency band.

As shown in FIG. 8, the example base station 800 includes a processor 801, a memory 802, a transceiver 803, an antenna 804 and a network interface 805. In particular embodiments, some or all of the functionality described above as being provided by a mobile base station, a base station controller, a node B, an enhanced node B, and/or any other type of mobile communications node may be provided by the base station processor 801 executing instructions stored on a computer-readable medium, such as the memory 802 shown in FIG. 8. Alternative embodiments of the base station may include additional components responsible for providing additional functionality, including any of the functionality identified above and/or any functionality to support the embodiments described above.

In an exemplary embodiment, the network node 800 is configured to be used in a cellular communication system and to communicate with the UE 700, which is configured to support a first frequency band, i.e. a harmonized frequency band $H_B$. The network node 800 comprises a transceiver 803, which is adapted to receive an indication from the UE 700 that the UE is able to recognize a channel numbering scheme related to at least one second frequency band, i.e. an individual frequency band $S_B$. The at least one second frequency band is a sub-band of the first frequency band or overlaps with the first frequency band. The network node 800 further includes a processor 801, which is adapted to determine if the at least one second frequency band is used in the network node 800. If the at least one second frequency band is used, the transceiver 803 is further adapted to send to the UE 700 at least one parameter related to the at least one second frequency band. Moreover, the at least one parameter is further related to the first frequency band, i.e. the harmonized frequency band $H_B$. Moreover, the transceiver 803 is also adapted to communicate with the UE 700 on the at least one second frequency band, i.e. the individual frequency band $S_B$.

In an exemplary embodiment, the transceiver 803 is adapted to receive, from the UE 700, a report that the UE 700 has first frequency band capability. Furthermore, it is adapted to send to the UE 700 at least one parameter related to at least one second frequency band, i.e. the individual frequency band $S_B$.

As described above, the network node 800 may be a core network node or a base station comprised in an E-UTRAN system or a core network node, a base station or a radio network controller comprised in a UTRAN system.

The present disclosure is not limited to the above-described preferred embodiments. Various alternatives, modifications and equivalents may be used. Therefore, the above embodiments should not be taken as limiting the scope of the disclosure.

The invention claimed is:

1. A method, implemented in a user equipment arranged to communicate with a network node in a cellular communication system, the method comprising:
configuring the user equipment to support a first frequency band, wherein the user equipment has not been configured to support a second frequency band, wherein the second frequency band comprises a sub-band of the first frequency band or overlaps with the first frequency band;

reporting to the network node that the user equipment has first frequency band capability without reporting any capability to support the second frequency band;

acquiring, in response to reporting the first frequency band capability, at least one parameter related to the second frequency band from the network node, the second frequency band being unidentifiable by the user equipment before the acquisition of the at least one parameter;

determining the second frequency band to which the acquired at least one parameter corresponds;

identifying and implementing a channel numbering scheme related to the second frequency band, the channel numbering scheme being currently unknown and currently unstored by the user equipment before the acquisition of the at least one parameter;

configuring the user equipment to operate in the second frequency band using the channel numbering scheme; and communicating with the network node on the second frequency band.

2. The method according to claim 1, wherein the first frequency band comprises a harmonized frequency band and the second frequency band comprises an individual frequency band.

3. The method according to claim 1, wherein the at least one parameter comprises a channel number of the second frequency band.

4. The method according to claim 3, wherein the channel number comprises an Absolute Radio Frequency Channel Number (ARFCN), a Universal Terrestrial Radio Access ARFCN, or an Evolved Universal Terrestrial Radio Access ARFCN.

5. The method according to claim 1, wherein the at least one parameter comprises a channel raster of the second frequency band.

6. The method according to claim 1, wherein the network node comprises a core network node or a base station comprised in an Evolved Universal Terrestrial Radio Access Network (E-UTRAN) system.

7. The method according to claim 1, wherein the network node comprises a core network node, a base station, or a radio network controller comprised in a Universal Terrestrial Radio Access Network (UTRAN) system.

8. A user equipment configured to communicate with a network node in a cellular communication system, the user equipment comprising:

a processor configured to:
configure the user equipment to support a first frequency band, wherein the user equipment has not been configured to support a second frequency band, and wherein the second frequency band comprises a sub-band of the first frequency band or overlaps with the first frequency band;

report to the network node that the user equipment has first frequency band capability without reporting any capability to support the second frequency band;

acquire, in response to reporting the first frequency band capability, at least one parameter related to the second frequency band from the network node, the second frequency band being unidentifiable by the user equipment before the acquisition of the at least one parameter;

determine the second frequency band to which the acquired at least one parameter corresponds;

identify and implement a channel numbering scheme related to the second frequency band, the channel numbering scheme being currently unknown and currently unstored by the user equipment before the acquisition of the at least one parameter;

configure the user equipment to operate in the second frequency band using the channel numbering scheme; and a transceiver configured to communicate with the network node on the second frequency band.

9. The user equipment according to claim 8, wherein the first frequency band comprises a harmonized frequency band and the second frequency band comprises an individual frequency band.

10. The user equipment according to claim 8, wherein the at least one parameter comprises a channel number of the second frequency band.

11. The user equipment according to claim 10, wherein the channel number comprises an Absolute Radio Frequency Channel Number (ARFCN), a Universal Terrestrial Radio Access ARFCN, or an Evolved Universal Terrestrial Radio Access ARFCN.

12. The user equipment according to claim 8, wherein the at least one parameter comprises a channel raster of the second frequency band.

13. The user equipment according to claim 8, wherein the network node comprises a core network node or a base station comprised in an Evolved Universal Terrestrial Radio Access Network (E-UTRAN) system.

14. The user equipment according to cairn 8, wherein the network node comprises a core network node, a base station, or a radio network controller comprised in a Universal Terrestrial Radio Access Network (UTRAN) system.

* * * * *

UNITED STATES PATENT AND TRADEMARK OFFICE
CERTIFICATE OF CORRECTION

PATENT NO. : 9,510,352 B2  
APPLICATION NO. : 13/201595  
DATED : November 29, 2016  
INVENTOR(S) : Kazmi et al.

It is certified that error appears in the above-identified patent and that said Letters Patent is hereby corrected as shown below:

In Column 16, Line 47, in Claim 14, delete "cairn" and insert -- claim --, therefor.

Signed and Sealed this
Eleventh Day of April, 2017

Michelle K. Lee
*Director of the United States Patent and Trademark Office*